(No Model.)
F. W. OLIN.
WEIGHING APPARATUS.
No. 601,674. Patented Apr. 5, 1898.
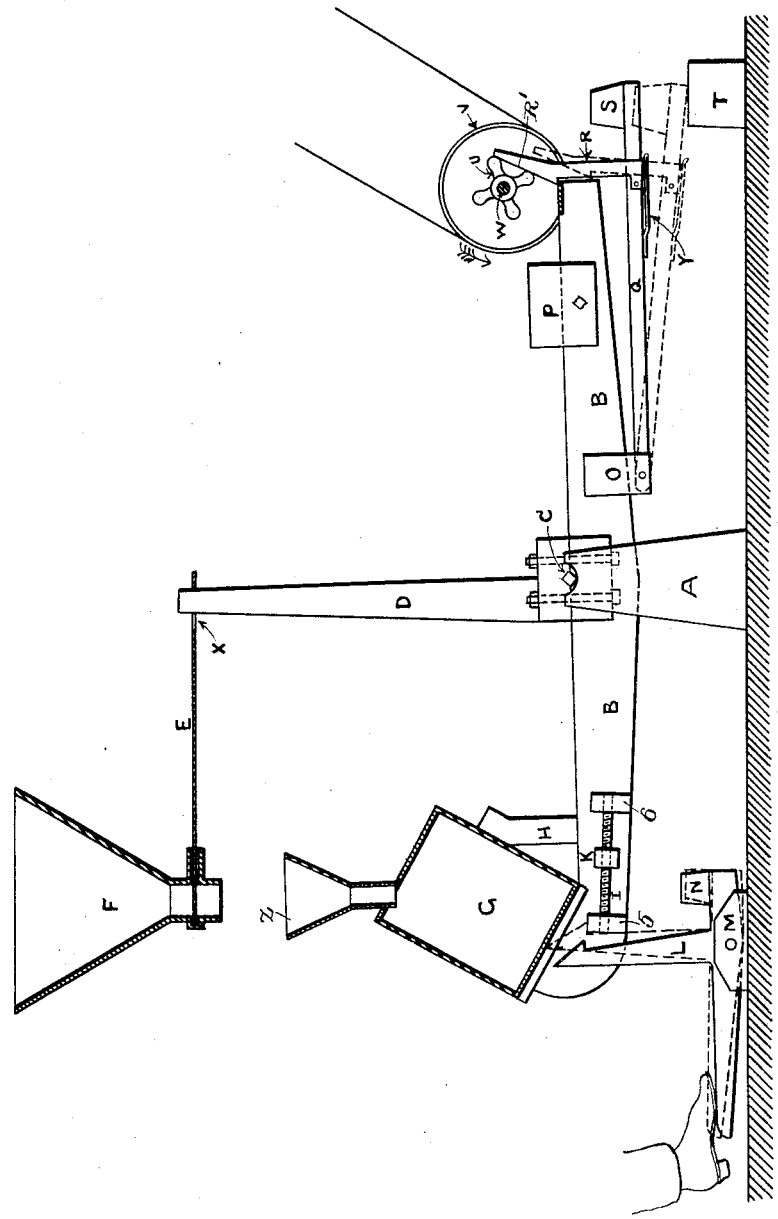
WITNESSES:
INVENTOR
F. W. Olin.
BY
ATTORNEYS.

UNITED STATES PATENT OFFICE.

FRANKLIN W. OLIN, OF ALTON, ILLINOIS.

WEIGHING APPARATUS.

SPECIFICATION forming part of Letters Patent No. 601,674, dated April 5, 1898.

Application filed March 5, 1896. Serial No. 581,940. (No model.)

*To all whom it may concern:*

Be it known that I, FRANKLIN W. OLIN, a citizen of the United States, residing at Alton, in the county of Madison and State of Illinois, have invented certain new and useful Improvements in Weighing Apparatus, of which the following is a full, clear, and exact description, reference being had to the accompanying drawing, forming a part hereof.

My invention has relation to improvements in weighing apparatus; and it consists in the novel arrangement and combination of parts more fully set forth in the specification and pointed out in the claims.

The figure represents a side elevation of my complete invention.

The object of my invention is to construct a weighing apparatus designed for use especially in the handling of gunpowder wherein a predetermined quantity of the powder may be accurately weighed and at the proper moment the supply of the powder fed to the can or other receptacle in which it is weighed and packed automatically cut off without in any way impairing the accuracy and constancy of the scale after the latter has been once set or adjusted for any given number of pounds. To this end I have devised an apparatus which in detail may be described as follows:

Referring to the drawing, A represents one of two standards or bearings between which the scale-beam B is fulcrumed, the knife-edges C acting as supports for the beam. Secured to the beam, on one side of the fulcrum thereof, is an upwardly-projecting arm D, whose free end projects through and operates within a slot x at the outer end of a sliding plate E, which controls the delivery end of a powder-supply hopper F, the inner end of the plate passing through the walls of the base of the hopper and normally closing the delivery end of the latter. One end of the beam B is adapted to support the powder-can G, provided with a suitable funnel Z, placed in position to receive the contents from the hopper F, the can being supported, as shown, by the inclined surface of the end of the beam and by a supporting-post H. From one side of that end of the beam which supports the can G project suitable arms or lugs 5 and 6, between which is mounted a screw-threaded rod I, on which is adjustable a nut K, the purpose of the latter being to properly adjust any variations in the weights of the cans carried at that end of the beam, and as different stocks of cans may vary slightly in weight a minute adjustment on the rod I of the nut K will set the beam properly.

The removable and sliding weight P is adjusted and set along the weighted arm of the beam until the position of the weight along said arm corresponds accurately to the number of pounds of powder to be weighed out in the can G. After the scale is once adjusted and the weight P is permanently set on the beam the weight P would normally tend to raise the end of the arm of the beam carrying the can. This end is therefore temporarily held down by the base or shoulder of the inclined locking end of a releasing-lever L, forming the vertical member of a bell-crank foot-lever, said locking end normally engaging the lug 5 of the beam and being kept in such engagement by the weight N, carried by the rear end of the extension of the horizontal member of the bell-crank lever, the tendency of the weight N being to tilt the locking end of the vertical member against the said lug 5. Forming a permanent part of the weighted arm of the beam (or that arm carrying the weight P) and pivoted from a depending plate O, secured to said beam, is a bar Q, to which is pivoted a trigger R, having an inclined extension R', the base of the extension being normally kept in engagement with the end of the weighted arm of the beam by means of the free end of a resilient spring-plate Y, secured at one end to the base of the bar Q, the free end of the spring-plate bearing against the base or foot of the trigger. The free end of the bar Q carries a weight S, and when the trigger is released from the beam the weight S permits the free end of the bar to drop on a block T.

Mounted on a shaft W and driven by any suitable source of power is a pulley V, the shaft having secured thereto adjacent to the pulley a series of arms U, each of which is adapted to impinge or forcibly strike against the inclined surface of the trigger extension R', the impact thus releasing the trigger from the end of the weighted arm of the beam and allowing the bar Q to drop on the block T, as already referred to.

The operation is as follows: Let us assume that the beam B is accurately set for the number of pounds to be weighed in the can G. The operator by depressing the horizontal member of the bell-crank foot-lever releases the end of the beam carrying the can and the weighted end of the beam or that carrying the weight P immediately drops or tilts downward, the weight S of the bar Q striking the block T. By this action the free end of the arm D swings far enough to the right to engage and strike against the end of the slot $x$ and shift the plate E outwardly and allow the contents from the hopper to fall into the funnel Z and thus fill the can. When the latter is sufficiently full, it begins to balance the weighted arm of the beam, gradually raising said arm to a horizontal or balanced position and bringing the inclined extension of the trigger into proximity to and finally into actual contact with the revolving arms U, driven, as before stated, by an independent source of power, whereby the trigger is struck by the arms and is disengaged from the free end of the weighted arm of the beam, and the weighted bar Q under the circumstances will drop, as indicated in dotted lines in the figure. This sudden release of the weighted arm Q will so lighten the normally-weighted arm of the beam that the arm carrying the can, now filled with powder, will suddenly drop, the locking end of the bell-crank foot-lever (which was released by the operator after his first manipulation thereof) reëngaging the lug 5, which the momentum of the now descending arm of the beam has carried below the shoulder of said locking end. The beam B in thus tilting suddenly in the reverse direction causes the arm D to shift the plate E in the reverse direction and thus again close the mouth of the hopper F. The can which is now filled with powder is removed by the operator and a fresh empty can is substituted. By the substitution of an empty can for a full one of course the weighing end of the beam becomes materially lightened and the weighted arm tends to tilt downwardly. Thereupon the operator by depressing the foot-lever L again releases the adjacent end of the beam, the weighted arm dropping until its free end reëngages with the trigger carried by the bar Q, which had dropped to the block T from the previous operation. By the dropping of the weighted arm, as indicated, of course the arm D is again tilted sufficiently to open the mouth of the hopper and the can at the weighing end of the beam again becomes filled. As it is filling it gradually balances the combined weights of the weighted arm of the beam and the weighted bar Q, carried by it, brings the trigger R of the latter into contact with the rapidly-revolving arms U, when the same operation is repeated as before, so that as the trigger R becomes released by means entirely independent of the weighing mechanism proper the latter becomes constant in its results, the number of pounds which each can holds being practically uniform.

Having described my invention, what I claim is—

1. In a weighing apparatus, a suitable pivoted weighing-beam, adapted to retain a weighing can or receptacle at the end of one arm thereof, a weight carried by the opposite arm indicating the number of pounds to be weighed, means operating in connection with the end carrying the receptacle for normally retaining the beam stationary against the gravitating action of the weight and subsequently releasing said beam and allowing the weighted arm to immediately or suddenly tilt downward, a suitable source of supply for the material to be weighed, and intermediate connections between the source of supply and the beam for controlling the delivery of the material to be weighed from the source of supply, substantially as set forth.

2. In a weighing apparatus, a suitable pivoted weighing-beam, a can at the free end of one arm thereof, a weight indicative of the number of pounds carried by the opposite arm, means operating in connection with the end carrying the receptacle for normally retaining the beam stationary against the gravitating action of the weighted arm and subsequently releasing the beam and allowing the weighted arm to immediately tilt downward, a suitable hopper, intermediate connections between the hopper and beam for opening the hopper with the sudden tilting of the beam in one direction, suitable means independent of the weighing apparatus for suddenly lightening the weighted arm of the beam and cause the beam to tilt in the opposite direction, whereby the closing of the hopper is effected, substantially as set forth.

3. In a weighing apparatus, a suitable weighing-beam adapted to retain a weighing-receptacle at the end of one arm thereof, and having a weighted arm carrying an adjustable or shifting weight adapted to be set for weighing a predetermined quantity of material and adapted to tilt the beam in one direction, an independent actuating device in connection with the weighted arm for reducing the weight of the arm to less than the weight of the arm carrying the receptacle whereby the beam will tilt in the opposite direction, means operating in connection with the arm carrying the receptacle for normally retaining the beam stationary against the gravitating action of the weight, and subsequently releasing said beam and allowing the weighted arm to tilt downward, and a suitable source of supply for the material to be weighed controlled by the beam, substantially as set forth.

4. In a weighing apparatus, a suitable pivoted beam, adapted to carry a can or other receptacle at the end of one arm thereof, a balance-adjusting device carried by said arm, a weight carried by the opposite arm indicative of the number of pounds to be weighed, a bar pivoted to the weighted arm, a trigger pivoted at the free end of the bar and adapted to engage the free end of the weighted arm, a spring-plate controlling said trigger, a weight carried at the free end of the bar pivoted to the weighted arm of the beam, a series of arms driven by an independent source of power and adapted to impinge against the trigger and release the same from the weighted arm of the beam, a releasing foot-lever for normally holding the beam in a horizontal position, a suitable hopper, a closing-plate for the mouth of the hopper, an arm carried by the beam and adapted to swing with the tilting of the latter, the free end of the arm controlling the movements of the closing-plate, the parts operating as and for the purpose set forth.

5. In a weighing apparatus, a suitable beam, a weighted arm for the same, a weighted bar pivoted to said arm, a spring-controlled trigger pivoted along said bar and adapted to engage with the free end of the weighted arm, an extension for said trigger having an inclined surface, a series of revolving arms driven from an independent source of power adapted to impinge against the inclined surface of the trigger extension, and suitable means for controlling the beam from the opposite arm thereof, substantially as set forth.

6. In a weighing apparatus, a suitable beam having a weighted arm, a weighted bar pivoted to said arm, a spring-controlled trigger pivoted along said bar and adapted to engage with the free end of the weighted arm, and an actuating device for tripping the trigger and releasing the bar from the weighted arm, substantially as set forth.

7. In a weighing apparatus, a suitable beam having a weighted arm, a weighted bar pivoted to said arm, a trigger pivoted along said bar and adapted to engage with the free end of the weighted arm, and an actuating device for tripping the trigger and releasing the bar from the weighted arm, substantially as set forth.

In testimony whereof I affix my signature in presence of two witnesses.

FRANKLIN W. OLIN.

Witnesses:
ALFRED A. MATHEY,
EMIL STAREK.